United States Patent [19]

Perlman

[11] Patent Number: 5,575,945
[45] Date of Patent: Nov. 19, 1996

[54] CHEMICAL TREATMENT SYSTEM FOR PRODUCING ODOR AND TASTE-FREE POTABLE WATER

[75] Inventor: Daniel Perlman, Arlington, Mass.

[73] Assignee: Brandeis University, Waltham, Mass.

[21] Appl. No.: 306,018

[22] Filed: Sep. 14, 1994

[51] Int. Cl.⁶ ........................................................ C02F 5/10
[52] U.S. Cl. ............................ 252/176; 252/175; 252/179; 210/756
[58] Field of Search ...................................... 252/175, 176, 252/179; 210/756

[56] References Cited

U.S. PATENT DOCUMENTS

| | | | |
|---|---|---|---|
| 1,078,918 | 11/1913 | Grüter | 210/756 |
| 2,105,835 | 1/1938 | Krause . | |
| 2,512,566 | 6/1950 | Marks et al. . | |
| 4,239,622 | 12/1980 | Ridgway . | |
| 4,243,525 | 1/1981 | Greenberg . | |
| 4,367,149 | 1/1983 | Kinman . | |
| 4,693,832 | 9/1987 | Hurst | 210/756 |
| 5,118,426 | 6/1992 | Duncan et al. | 210/721 |
| 5,120,452 | 6/1992 | Ness et al. | 210/754 |
| 5,330,658 | 7/1994 | Grant et al. | 210/727 |

FOREIGN PATENT DOCUMENTS 9204828 6/1994 Brazil .
4360672 12/1992 Japan .

OTHER PUBLICATIONS

Translation of Japanese Reference Kokai No. 04–360672 (Date Unknown).

*Primary Examiner*—Prince Willis, Jr.
*Assistant Examiner*—James M. Silbermann
*Attorney, Agent, or Firm*—Foley & Lardner

[57] ABSTRACT

A treatment system to treat microbially contaminated water and provide a resultant product which is odor and taste-free is disclosed. The system comprises separate quantities of hypochlorite and peroxide generating chemicals. The system is used by first admixing the hypochlorite-containing solution with water and after an interval adding the peroxide-generating material. The peroxide rapidly reacts with and destroys the hypochlorite along with its taste and odor. In a most preferred embodiment, the system includes a third pre-measured quantity of a reducing agent, such as sodium thiosulfate, which may be added following the peroxide treatment step to destroy any hypochlorite-generated chloramine compounds.

8 Claims, 1 Drawing Sheet

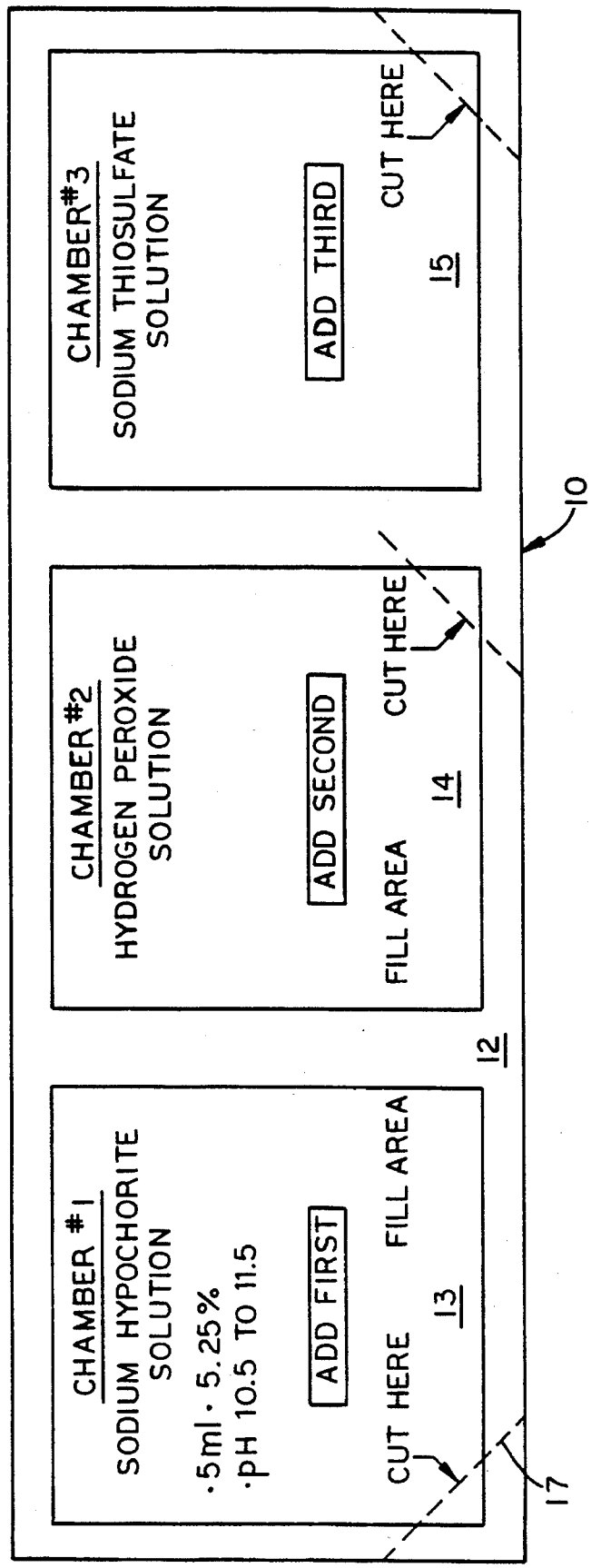

CHEMICAL TREATMENT SYSTEM FOR PRODUCING ODOR AND TASTE-FREE POTABLE WATER

BACKGROUND OF THE INVENTION

Field of the Invention and Description of the Prior Art

Numerous systems have been proposed for treating water to provide an odor and taste-free product. Active chlorine-based inorganic and organic compounds supplied in both solution and solids forms, have been used for many years. These compounds, when mixed with water, generate the disinfectant hypochlorous acid which imparts a distinct taste and odor to the water. Hypochlorous acid is in chemical equilibrium with the hypochlorite anion (pKa=7.5).

In the book entitled *Inhibition and Destruction of the Microbial Cell*, W. B. Hugo, editor, 1971, J. R. Trueman points out in Chapter 3E (The Halogens):

"Sodium hypochlorite is a sterilizing agent in that it will kill all forms of microorganism. The spectrum includes viruses, non-acid-fast vegetative bacteria, acid-fast bacilli, bacterial spores, fungi, algae and protozoa. The most resistant forms of microbial life are bacterial spores, so that the ultimate criterion of a sterilizing agent is sporicidal activity. The view has been expressed that no chemical disinfectant is available which will kill bacterial spores (Gibson, 1968). On the other hand there is a wealth of information available to substantiate the fact that sodium hypochlorite is sporicidal (Finch, 1958)(p. 150)."

Chemical treatments typically follow a first purification step wherein the water is filtered to remove organic material and other suspended particulates. Generally, between 1 and 200 parts per million (ppm) of active chlorine (as hypochlorite) are then utilized to disinfect water, depending upon the level of reactive organic material present in the water and the type of suspected pathogens which must be eliminated. Often, between 1 and 10 ppm is added to food processing plant process water, while food handling equipment and surface-contaminated meat and fish may be routinely disinfected with 100 to 200 ppm chlorine. By contrast, the chlorine level typically found in public drinking water is seldom greater than 1 ppm.

Significant drawbacks associated with the utilization of high levels of chlorine to disinfect microbially contaminated water include the disagreeable taste and the odor of hypochlorous acid and hypochlorite (hereinafter referred to collectively as "hypochlorite"). Several systems are disclosed wherein chlorine-type treatments are used after hydrogen peroxide treatment. For example, in U.S. Pat. No. 4,243,525 issued Jan. 6, 1981 to Greenberg for "Method For Reducing The Formation of Trihalomethanes In Drinking Water", trihalomethanes are reduced by adding hydrogen peroxide to the water prior to chlorination. In the most preferred embodiments, the water is treated with 0.1 to about 50 ppm of hydrogen peroxide, following which sufficient chlorine is reacted with the hydrogen peroxide to maintain a residual amount of chlorine sufficient to disinfect the water and reduce the formation of trihalomethanes to less than 295 parts per billion (ppb).

In U.S. Pat. No. 4,693,832 issued Sep. 15, 1987 to Hurst for "Preparation Of Safe Drinking Water" the disinfection process comprises a first semi-finishing step and then adding dilute solutions of hypochlorous acid having a pH between 3 and about 6. Among the various pre-treatment steps referred to are treatments with chlorine dioxide, chlorine, hypochlorous acid, ozone, hydrogen peroxide and potassium permanganate.

Other water treatment systems are described in U.S. Pat. No. 2,105,835 issued Jan. 18, 1938 to Krause and entitled "Sterilizing Liquid"; U. S. Pat. No. 2,512,566 issued Jun. 20, 1950 to Marks, et al. for "Method of Sterilizing Small Quantities Of Water"; U.S. Pat. No. 4,239,622 issued Dec. 16, 1980 to Ridgway for "Process For The Disinfection Of Water"; and U.S. Pat. No. 4,367,149 issued Jan. 4, 1983 to Kinman for "Water Purification Process". A commercial product known as Potable Aqua® uses a two step approach employing an iodine tablet and a subsequent ascorbic acid tablet for neutralization.

What is missing from the teachings of the prior art covering hypochlorite-based disinfection of drinking water is a final drinking water product which is odor and taste-free and which preferably contains neither hypochlorite residues nor organic chemical carrier residues typically associated with hypochlorite generating tablets (e.g. Halazone and dichloroisocyanurate). In addition, organic hypochlorite generating tablet systems which are based upon first dissolving the tablet and subsequently hydrolyzing the dissolved organic compound to generate hypochlorite are slow and inconvenient. A treatment system which would overcome the aforementioned disadvantages of the prior systems would represent a significant advance in this technology.

SUMMARY OF THE INVENTION

The present invention overcomes the drawbacks of the prior art of water treatment and results in odor and taste-free potable water.

The present invention features a system in which microbially contaminated water is first rendered disinfected by treatment with hypochlorite in substantial concentrations, especially above 1.0 ppm. "Hypochlorite" as used herein includes both the ionic form (OCl), and the free acid form, i.e. hypochlorous acid (HOCl).

The invention further features a technique for eliminating the disagreeable taste and odor associated with residual hypochlorite and chloramine compounds (produced by the reaction of hypochlorite with protein materials in the water) through the use of a subsequent treatment step employing hydrogen peroxide.

The invention further features the use of chemical sources of hypochlorite, e.g. inorganic salt. forms of hypochlorite, in which the release of hypochlorite is complete and immediate when it is added to the water.

The invention further features, in its most preferred embodiment, a third treatment step in which a reducing agent, such as sodium thiosulfate is added to reduce any chloramines which may be present.

In a preferred embodiment, the present invention also features a kit which includes pre-measured quantities of the hypochlorite and hydrogen peroxide generating chemical, and in the most preferred embodiment a separate compartment containing a pre-measured quantity of the reducing agent.

In its most preferred embodiment the present invention also features a plurality of pouches which contain the pre-measured quantities of the treating liquids, which pouches may be foil pouches lined on their inner surfaces with resin materials which are opaque and non-reactive to the chemical components which they contain.

How these and other features of the invention are accomplished will be described in the following Detailed Description of the Preferred Embodiment, taken in conjunction with the FIGURES. Generally, however, the features of the invention are provided by a system which utilizes pre-measured quantities of a hypochlorite solution and a hydrogen peroxide solution, the latter being used in a reaction-excess, i.e. stoichiometric excess. The reactants are added sequentially to the water being treated, the hypochlorite requiring approximately 5–10 minutes for complete disinfection, following which the peroxide is added. As an optional final step, a pre-measured quantity of sodium thiosulfate, or other FDA approved chemical which is generally regarded as safe and which is capable of reducing chloramines, is then added. It is most desirable to eliminate such odor-contributing chloramine compounds which may be formed by reaction between hypochlorite and any proteinatious material which may be present in the water being treated. In its most preferred embodiment, the system is packaged in a kit which includes sealed compartments with dosage units, preferably compartments which are unbreakable, i.e. flexible packaging structures. The components should be chemically inert, opaque to light and also gas and liquid impermeable. Using such a kit, a pre-measured quantity of water may be treated by the sequential addition of the two or three treating liquids to create the odor and taste-free potable water which is the desirable end product of the present invention.

Other ways in which the features of the invention are provided will become apparent to those skilled in the art after they have read the present specification. Such other ways are deemed to fall within the scope of the present invention if they fall within the scope of the claims which follow.

BRIEF DESCRIPTION OF THE DRAWING

The FIGURE is a schematic illustration of a treatment system for preparing potable water containing three pouches for reagents and tear areas, it being understood that the use of three reagents is most preferred, but that two can be employed for most applications.

DETAILED DESCRIPTION OF THE PREFERRED EMBODIMENT

Before proceeding to the detailed description of the most preferred embodiment of the present invention, several general comments are warranted with regard to the general applicability and scope thereof. First, certain preferred chemicals are used for generating hypochlorite and hydrogen peroxide, but others know to the art can be employed. Second, the most preferred embodiment is one in which a three step process is utilized, including a final step of reducing chloramines which may be formed during the initial reaction. That step may not be necessary where the principal desire is the treatment of large quantities of water quickly and inexpensively. For example, the present invention may have application in the camping and backpacking fields where the user may desire to safely drink stream water, lake water or the like. However, it should be recognized that the present invention has a much wider applicability, for example, for use during emergencies such as floods, hurricanes, earthquakes, water supply contamination and the like.

The recognition of the wide applicability of this invention will lead those skilled in the art to the natural conclusion that the size of the packages in which the various reagents are contained will vary widely. For example, for camping and backpacking, the most preferred system may include small flexible pouches connected to one another, each containing pre-measured quantities of liquid. These pouches are non-breakable and can be readily packed in the gear of the user. For other applications, such as for emergency relief and the like, the reagents could be packaged in much larger quantities for use by governmental agencies. Furthermore, the particular materials of which the containers are made are not, in and of themselves, part of the present invention, so long as they are non-reactive to the reagents. Certain preferred materials will be discussed later in this specification.

Proceeding now to the detailed description of the preferred embodiment, the invention is based upon a two step chemical treatment, with a third step added in the most preferred embodiment. The first chemical treatment step is the use of a pre-measured quantity of hypochlorite solution for disinfection and/or sterilization of the water. Chemicals capable of generating hypochlorite which are either generally regarded as safe (GRAS) or are otherwise approved by the FDA or EPA for human consumption are suitable for use in the present invention. One suitable and preferred material is 5.25% (w/v) NaOCl.

The hypochlorite solution should be used in a concentration sufficient to provide for the disinfection of water containing a wide variety of pathogenic organisms and the concentration may range, depending on application, from approximately 5 to more than 500 ppm. Again, the main selection criteria is the burden of reactive organic material in the water. For many applications, a concentration of 50 ppm is suitable for disinfecting clear water. For example, 5 ml of 5.25% (w/v) sodium hypochlorite solution would be sufficient to disinfect 5 liters of water (a 1,000 fold dilution provides an ultimate concentration of 50 ppm). For water suspected or known to be grossly contaminated or carrying high levels of organic material, a greater concentration could be used, e.g. in the 500 to 1,000 ppm range. Other suitable inorganic materials for providing the hypochlorite for the present invention include calcium hypochlorite, potassium hypochlorite, lithium hypochlorite, chlorinated trisodium phosphate and bleaching powder. Organic compounds which generate hypochlorite through hydrolysis of labile chlorine groups and which leave residual organic compounds in the treated water are less desirable materials for use in the present invention.

The pH of the aforementioned readily available aqueous solution of sodium hypochlorite containing 5.25% (w/v) is between 10.5 and 11.5, owing in large measure to the use of sodium hydroxide to stabilize the hypochlorite solution. When diluted with water, the pH of the hypochlorite solution will decrease, and with a 1,000 fold dilution, the pH would decrease approximately 3 units to about pH 8. This pH range is appropriate for human drinking water and will not be appreciably altered after the destruction of the hypochlorite.

With regard to the time involved for the first treated step, I have found that about 5–15 minutes exposure is sufficient for the elimination of pathogenic microorganisms.

The second water treatment step involves the addition of a solution containing hydrogen peroxide or hydrogen peroxide-generating chemicals, so that the following reaction takes place:

$$H_2O_2 + NaOCl \rightarrow H_2O + O_2 + NaCl$$

Moreover, in the present invention, it is important to have a slight reaction excess of the hydrogen peroxide, with an excess of approximately 5–25% molar excess being most preferred. This excess is provided to ensure complete reaction, even if a small percentage of the hydrogen peroxide fails to be delivered from its container to the water. If, for example, 3% (w/v) $H_2O_2$ and the aforementioned commercially available hypochlorite solutions are each packaged in compartments of a treating kit in undiluted form, their respective concentrations would be 0.882M $H_2O_2$ (i.e., 30 g/l divided by 34 g/mole) and 0.705M NaOCl (i.e., 52.5 g/l divided by 74.44 g/mole). Thus, the $H_2O_2$ is approximately 1.25 more concentrated on a molar basis than the sodium hypochlorite, and one volume of the hydrogen peroxide would provide a 25% reaction excess in neutralizing or destroying the bleach solution. If, for example, only a 10% reaction excess is desired, the 3% hydrogen peroxide could be diluted to 2.64% and equal volumes of the bleach and the peroxide could again be packaged for coupled use in the system.

Laboratory experiments utilizing quantitative iodometry to assay residual hypochlorite present in water following addition of a 10% molar excess of hydrogen peroxide to hypochlorite solutions have shown no detectable hypochlorite present within 10 seconds following the addition of the hydrogen peroxide. This remarkable speed indicates that almost immediately after adding and mixing the peroxide into the water, the disinfected water may be consumed. The present inventor has taste-tested the treated water and confirmed that immediately following the addition of the molar excess of hydrogen peroxide, no residual chlorine taste was detected, even in a sample treated with 1,000 ppm hypochlorite.

As previously mentioned, an optional step may be performed if it is known or suspected, for example based on odor, that chloramines have been formed in the water by reaction of the hypochlorite with proteinaceous or other amine-containing compounds in the water. The way in which this is done in the present invention is by following the peroxide treatment step with a reducing agent treatment such as sodium thiosulfate, a material generally regarded as safe and approved by the FDA. Such material is capable of reducing chloramine compounds and is preferably added at a final concentration of approximately 0.5 millimoles per liter of water. Since hypochlorite treatment with 50 ppm available chlorine introduces the chlorine atom at a concentration of only 0.7 mM, the addition of thiosulfate at 0.5 mM is more than adequate. In fact, the bulk of the chlorine present as hypochlorite will already have been chemically reduced by the peroxide added in the previous step. In addition to chloramines, any unreacted peroxide remaining in the water is also reduced by the thiosulfate, which on a molar basis can reduce 2 moles of hydrogen peroxide for each mole of thiosulfate being oxidized to sulfate. The latter reaction is really an added bonus, because hydrogen peroxide present at the levels referred to in this application is harmless and conveys no taste or odor to the water. For a specific example, it can be noted that if packaged for use with the aforementioned commercially available hypochlorite and peroxide solutions, the thiosulfate may be packaged at a concentration of approximately 0.5 molar, so that a 1,000 fold dilution would provide a final concentration of 0.5 mM.

Before proceeding to a description of the FIGURE, it should be mentioned that the chemical treatment steps of the present invention can be used with other treatment steps such as simple filtration, for example using paper filters such as cellulose fiber filters and the like. Microporous filters are also commonly available for use in treating water in the field. Preferably, such filtration steps are accomplished prior to the treatment using the system of the present invention.

Referring now to the FIGURE, a kit 10 according to the present invention includes a pair of foil laminates sealed in the areas designated 12 to form three chambers 13, 14 and 15. The interior surface of the laminate material preferably includes a heat-sealable thermoplastic resin so that heat sealing can be used to provide the chambers. The resin should be chemically non-reactive with any of the solutions and should be gas and liquid impermeable. Moreover, it is preferable that the kit include at least one layer which is opaque to visible light, so that the solutions will not be prematurely affected by exposure of the kit to sun or other light sources. Instructions can be provided on the exterior of chamber 13, such as the words "Add First." Moreover, a tear area 17 may be provided for this chamber, as well as for the other chambers, to facilitate removal of the contents. Similarly, chamber 14 will include the hydrogen peroxide solution and can include the notation "Add Second", while chamber 15, if it is used at all, would contain the reducing agent, such as sodium thiosulfate, and the designation "Add Third." As previously indicated, the particular construction of the laminated compartments is not believed to be critical, and the reactions would be just as effective if the liquids were contained in plastic tubes, metal cans (lined with protective resins) and the like. General information about the use of the kit could be provided on the back of the structure, such as a description of the amount of water to be treated by the system, suitable safety warnings and the like.

While the present invention has been described in connection with one FIGURE and a discussion of the two or three step methods which form the basis of the present invention, modifications in regard to concentrations and the particular chemical compositions can be made without departing from the invention scope. As mentioned earlier, the scope of the invention is not to be limited by the description or the FIGURE but is to be limited solely by the scope of the claims which follow.

What is claimed is:

1. A system for treating a quantity of contaminated water to produce an odor and taste-free potable water therefrom, the system including premeasured quantities of a first and a second treating solution, the first treating solution containing a chemical capable of providing hypochlorite and the second treating solution comprising hydrogen peroxide, the second treating solution being in a sufficient quantity and concentration to provide a 5–25% stoichiometric excess of hydrogen peroxide when compared to the hypochlorite-containing first treating solution and wherein a third treating solution is provided comprising an aqueous solution of a chemical capable of reducing chloramines, that chemical being sodium thiosulfate.

2. The system of claim 1, wherein the first treating solution comprises an aqueous sodium hypochlorite solution.

3. The system of claim 2, wherein the first treating solution provides from about 50–1,000 ppm sodium hypochlorite when added to the quantity of contaminated water.

4. The system of claim 1, wherein the first treating solution comprises sodium hypochlorite having a concentration of about 5.25% (w/v) and the hydrogen peroxide has a concentration of about 3% (w/v).

5. The system of claim 1, wherein the treating solutions are premeasured quantities contained in flexible pouches, the flexible pouches having an inner surface which is non-reactive to the chemical treating solutions and which is gas, liquid and light-impermeable.

6. The system of claim 5, wherein the inner surface is a thermoplastic resin.

7. A system for treating a quantity of contaminated water to produce an odor and taste-free potable water therefrom, the system including premeasured quantities of a first and a second treating solution, the first treating solution containing a chemical capable of providing hypochlorite and the second treating solution comprising hydrogen peroxide, the second treating solution being in a sufficient quantity and concentration to provide a 5–25% stoichiometric excess of hydrogen peroxide when compared to the hypochlorite-containing first treating solution and wherein the treating solutions are premeasured quantities contained in flexible pouches, the flexible pouches having an inner surface which is non-reactive to the chemical treating solutions and which is gas, liquid and light-impermeable.

8. The system of claim 7, wherein the inner surface is a thermoplastic resin.

\* \* \* \* \*